United States Patent [19]

Huellmantel et al.

[11] 3,878,678
[45] Apr. 22, 1975

[54] GAS TURBINE FUEL SYSTEM

[75] Inventors: Louis W. Huellmantel; Charles G. Matthews, both of Warren; Gary E. Nordenson, Mount Clemens, all of Mich.

[73] Assignee: General Motors Corporation, Detroit, Mich.

[22] Filed: Aug. 20, 1973

[21] Appl. No.: 389,955

[52] U.S. Cl. .......................................... 60/39.28 R
[51] Int. Cl. .............................................. F02c 9/08
[58] Field of Search .............................. 60/39.28 R

[56] References Cited
UNITED STATES PATENTS

| | | | |
|---|---|---|---|
| 2,165,696 | 7/1939 | Charter | 417/471 X |
| 2,980,175 | 4/1961 | Szydlowski | 60/243 |
| 3,121,456 | 2/1964 | McCathron | 60/39.28 R |
| 3,236,047 | 2/1966 | Stresen-Reuter | 60/39.28 R |
| 3,240,013 | 3/1966 | Spath | 60/39.28 R |
| 3,279,169 | 10/1966 | Bayard | 60/39.28 R |

Primary Examiner—Clarence R. Gordon
Attorney, Agent, or Firm—Paul Fitzpatrick

[57] ABSTRACT

A fuel system for a gas turbine engine controls operation of the engine by varying flow of fuel to the engine. When there is a substantial deceleration of the engine, the fuel control shuts off fuel flow. This normally would result in extinction of flame in the combustion apparatus. To avoid the necessity of reigniting the engine, with possible undesirable emissions, a small gas pressure loaded accumulator is connected to the engine fuel line. This charges with fuel when fuel pressure is increased and discharges, to provide a gradually decreasing flow for a short time, when fuel pressure is decreased. The temporary flow from the accumulator is sufficient to maintain combustion during deceleration.

4 Claims, 1 Drawing Figure

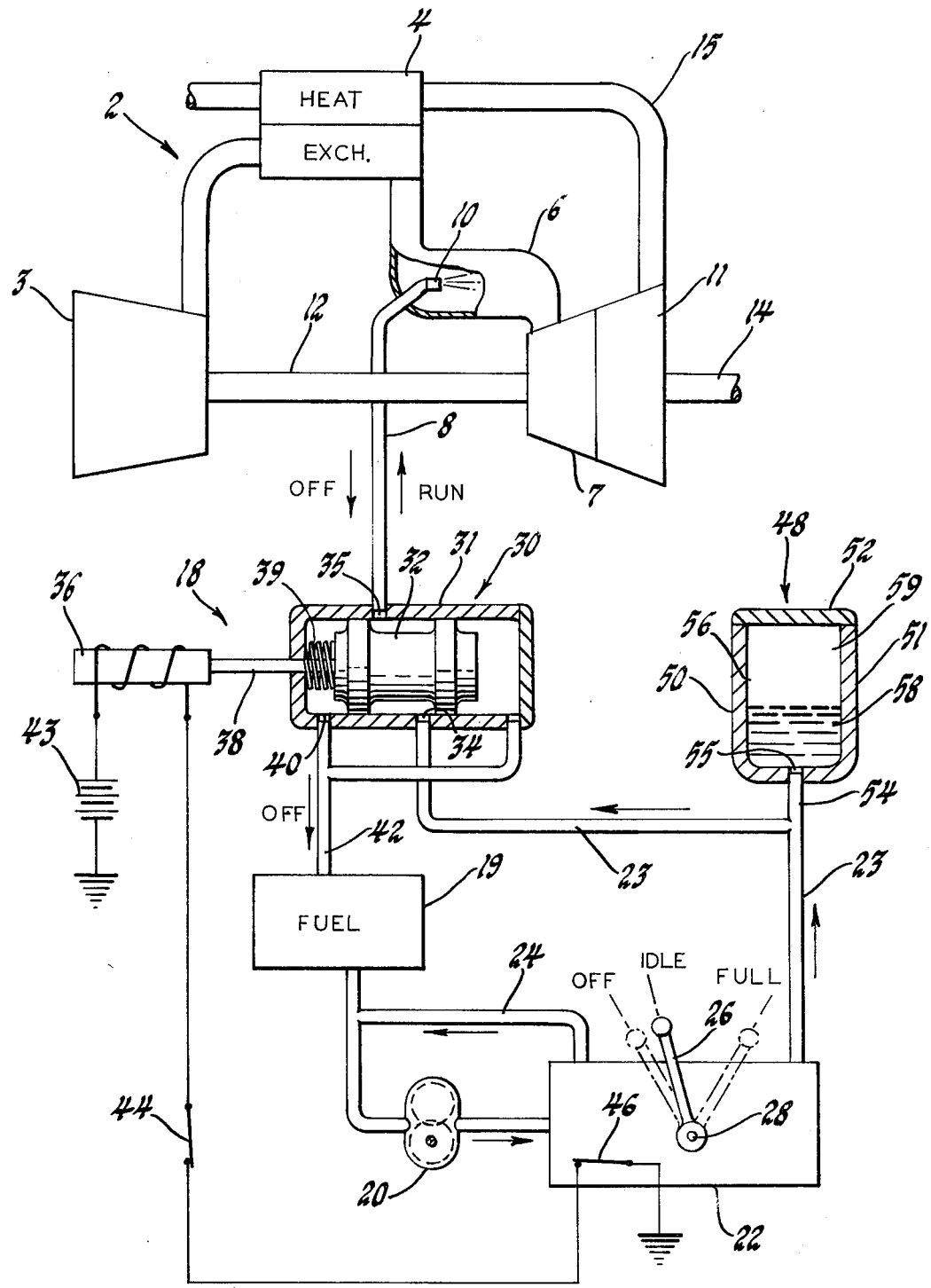

GAS TURBINE FUEL SYSTEM

Our invention relates to gas turbine engines, and particularly to small gas turbine engines operating at varying power levels, such as those designed for use in automotive vehicles.

The basic control of such engines ordinarily is by regulating the amount of fuel supplied. This is controlled manually, but the actual fuel supply ordinarily is under various supervisory controls to prevent overspeed, overtemperature, or surge, or other undesirable conditions in the engine. Thus, the engine is operated at low speed and small fuel flow for idling; and to increase the power output the fuel is increased progressively or as quickly as feasible. It may go to the maximum value to provide maximum power output of the engine. To decrease power output, the supply of fuel is decreased. Generally, it is desirable that the fuel flow be decreased as rapidly and as fully as possible for deceleration of the engine, to minimize waste of fuel and to minimize power output of the engine when it is desired to have the vehicle slow down.

It is possible to terminate flow of fuel altogether during deceleration, and this mode of operation has been employed in some instances. However, it requires a constantly operating ignition system or an igniter which is turned on every time a deceleration is completed. Moreover, the completeness of combustion of a gas turbine engine during steady state operation is excellent, but during any start-up of the combustion apparatus there may be some failure to complete combustion as burning is initiated. For this reason, we consider it desirable not to have combustion terminate during deceleration; but, on the other hand, we wish to minimize unnecessary flow of fuel at a time when no engine power output is required.

We have discovered that very desirable operating characteristics during deceleration, with maintenance of combustion and minimum consumption of fuel, may be attained by the very simple expedient of connecting a gas-loaded or equivalent fuel accumulator to the engine fuel line. This is employed with a fuel nozzle or other means for discharging fuel into the combustion apparatus which presents a constant orifice area and therefore in which the flow of fuel is a direct function of the pressure difference between the supplied fuel and the air in the combustion apparatus. The preferred accumulator, which has a constant volume, contains air which is compressed by fuel which flows into it as fuel pressure in the line leading to the engine is increased. This fuel flows from the accumulator under the action of the compressed air as fuel pressure is reduced or shut off by action of the engine fuel or power control.

The principal objects of our invention are to improve the economy and suitability of gas turbine engines, to provide for maintenance of combustion in an engine during deceleration with minimum waste of fuel, and to provide a simple accumulator arrangement for providing deceleration fuel flow to a gas turbine engine.

The nature of our invention and its advantages will be apparent to those skilled in the art from the succeeding detailed description of the preferred embodiment of the invention and the accompanying drawing.

The drawing is a schematic diagram of a gas turbine fuel system embodying our invention.

Referring to the drawing, a typical gas-coupled regenerative gas turbine engine is illustrated at 2. The engine includes a compressor 3, a heat exchanger 4, a combustion apparatus or burner 6, and a high pressure or gas generator turbine 7. The compressor delivers compressed atmospheric air through one pass of the heat exchanger to the burner 6. A fuel supply line 8 delivers fuel to a fuel spray nozzle 10 in the burner. The fuel is ignited, and the resulting combustion products flow through turbine 7 to a low pressure power output turbine 11. Turbine 7 drives compressor 3 through a shaft 12. Power output turbine 11 drives a shaft 14 which may be connected to a driven device, such as the vehicle wheels, through any suitable power transmission mechanism. The power turbine exhausts through ducting 15 and the other pass of heat exchanger 4 so that the exhaust gases heat the compressed air flowing to the burner. This engine structure may be regarded as conventional and well known to those skilled in the art. Examples of such an engine are described in United States patents to Collman et al, U.S. Pat. No. 3,077,074, Feb. 12, 1963 and to Bell, U.S. Pat. No. 3,490,746, Jan. 20, 1970. It is well known that the speed of operation of turbine 7 which drives only the compressor 3 and accessories is a function of the quantity of fuel supplied to the nozzle 10, subject to variation by ambient atmospheric conditions of temperature and pressure. For given atmospheric conditions, the supply of fuel to the nozzle determines the speed of operation of the gas generator and the power available as motive gas to the power output turbine 11. Such an engine is normally operated over a wide range of power output from idling to full power and, particularly in vehicle operation, the demand for power may vary greatly as the vehicle stops in traffic, accelerates, moves at constant speed, and then decelerates; also, as grades are encountered.

We have illustrated the application of our invention to a conventional fuel control system 18 for such an engine which operates by controlling the flow of fuel to the engine. A pump 20, which ordinarily is driven from the gas generator shaft 12, takes fuel from a fuel tank 19 and delivers it to an engine power control or fuel control 22. The fuel control 22 delivers fuel at a metered rate to an engine fuel line 23 and returns excess fuel to the pump inlet through a by-pass line 24. The power level of the engine is controlled by the power level request arm or manual power control 26. As illustrated, this varies the position of a shaft 28 entering the fuel control which operates suitable valving in the fuel control to achieve the desired end of regulating engine power level or gas generator speed. The control 26 may, in practice, be a linkage connecting the fuel control to an accelerator pedal of a vehicle.

The structure within the fuel control 26 may be of any suitable conventional type and therefore is not described. Examples of such controls are described in the literature and are well known to those skilled in the art. So far as we are here concerned, it may be similar to the speed control system illustrated in McCathron et al U.S. Pat. No. 3,121,456, Feb. 18, 1964, in which the power level request arm varies the speed setting of a governor driven by the gas generator shaft and the governor opens or closes a metering valve in response to engine underspeed or overspeed. In such controls, the excess pump capacity may be returned through a bypass valve controlled to maintain the pressure drop across the metering valve at a constant level. Various alternative modes of control are possible, but this is a simple and conventional one. Also, such controls may, if desired, include feedbacks of engine speed or temperature and power turbine speed or acceleration to limit or shut off fuel in response to undesirable levels of these conditions.

As illustrated, the arm 26 is movable from an Off position in which the engine is shut down to an Idle position and on through a range of power or speed level to the full power position indicated. The control system associated with the power control 22 is illustrated in the idle condition. Engine fuel line 23 is connected to the engine through a fuel shutoff valve 30. This valve as illustrated is a conventional solenoid-operated three-way valve including a cylinder 31 and a spool or piston 32 having two lands near the ends of the piston. Line 23 enters the cylinder through a central port 34 and, in the operating condition of the engine, leaves the valve through an outlet port 35 to which line 8 is connected. In the position of the valve shown for operation of the engine, these ports lie between the lands of the spool. The spool is retained in this position by a solenoid 36 connected to the valve spool by a stem 38. When the solenoid is deenergized a compression spring 39 moves the spool to the right as illustrated so that communication between ports 34 and 35 is blocked and port 35 is put into communication with a return port 40 connected by a drain line 42 to the fuel tank. The opposite end of the cylinder is also connected to the drain line 42 so that the valve spool is pressure balanced in all conditions of operation and is not blocked by trapped fluid.

Normally, the solenoid 36 is energized for operation of the engine by a circuit from the vehicle battery 43 through a start and run switch 44 and a shutdown switch 46. Switch 44 is closed to start the engine and to keep it in operation and may be opened when it is desired to stop the engine. Switch 46, which is normally closed, is opened by suitable mechanism in the fuel control in response to an emergency condition such as overspeed or overtemperature. Opening of either switch deenergizes solenoid 36, allowing spring 39 to move valve spool 32 to shut off the flow of fuel to the engine. In addition, since this valve provides a drain from the engine to the tank, it allows residual pressure in the burner 6 to purge the line 8 and deliver the fuel to tank 19.

This brings us to the accumulator 48 which is added to the known system to provide the improved operation during acceleration outlined in the introductory portion of this disclosure. The accumulator 48 is shown more or less schematically, since such accumulators are articles of commerce. The accumulator has a sealed casing 50 illustrated as comprising a cylinder 51 and a cylinder head 52. A branch 54 of fuel line 23 enters the lower end of the cylinder through a port 55. The accumulator casing 50 defines a sealed chamber 56 the lower portion of which contains a variable amount of fuel indicated at 58. The upper portion 59 of chamber 56 contains a compressible fluid which is preferably simply air. Initially, the accumulator is simply full of air at atmospheric pressure, but when it is connected to the fuel line, as fuel pressure increases above atmospheric to deliver fuel to the burner, fuel will enter the accumulator, compressing the air to the pressure of the fuel. The volume of air is inversely proportional to the pressure for any given temperature and the volume of the fuel is the remainder of the volume of chamber 59.

If we assume the engine is operating under normal full speed conditions, the fuel may be at a pressure of about 100 psig. If, then, the fuel control is moved rapidly from full speed to idle, for example, the fuel control governor will shut off full fuel into line 23 from control 22. The accumulator 48 will discharge as a function of the pressure difference between the air in the accumulator and the pressure within burner 6. As the air in the accumulator expands, the pressure decreases and the flow of fuel decreases more or less exponentially. At the same time, the decreased fuel flow causes the gas generator to decelerate, reducing the pressure of air supplied to the burner 6. There is thus a gradual decay of gas generator speed, burner air pressure, fuel pressure, and fuel flow over a short period of time.

When the engine is slowed down to the reduced speed setting (idle, or whatever it may be), the governor and other fuel control mechanisms again supply fuel to line 23 to maintain the gas generator in operation at the new speed and power level. This will terminate the discharge of fuel from the accumulator when its pressure level reaches that of line 23.

If the power control is moved for higher power, this involves supply of fuel at a greater rate, and therefore at a higher pressure due both to the increased pressure drop through the fuel nozzle and to the increasing combustion chamber air pressure. The increasing fuel pressure causes restoration of fuel to the accumulator 48.

It is assumed that the valving in fuel control 22 prevents return flow of fuel. If not, a check valve may be installed in line 23 to block return flow from the accumulator.

The accumulator turns out to be quite a small device. In the particular application an accumulator of one cubic inch volume has been found very satisfactory. This is with an engine which has a full power fuel flow of about 1.1 cubic inch of fuel per second and idling fuel flow of about 0.13 cubic inches per second. It will be seen that the accumulator capacity is of the order of the volume of fuel supplied to the engine at full power in one second.

The amount of fuel stored will vary with power level and the amount discharged will vary with power level decrease, as needed during the deceleration period.

The size of the accumulator will depend upon characteristics of the engine other than fuel flow to some extent. The optimum size of the accumulator can be readily determined by experiment to achieve the deceleration characteristic considered optimum for a particular engine and particular conditions of operation. The accumulator should be sufficiently large to prevent flameout on a sharp cutback in power setting and, on the other hand, should not be so large as to unduly prolong deceleration or use fuel unnecessarily during the deceleration process. With the installation described, the time for the gas generator to decelerate from 40,000 to 22,000 revolutions per minute is about 3.5 seconds, while it is about three seconds if fuel flow is terminated entirely to cause flameout of the burner.

Thus, it will be seen that this extremely simple addition to the normal fuel control system provides improved deceleration characteristics and eliminates the need for relighting the engine after deceleration.

If the engine is shut down by opening switch 44 or switch 46, the accumulated fuel is blocked from the engine by valve 30.

We are aware of the fact that the McCathron et al patent referred to above includes means for storing fuel during increases in engine governor setting and discharging such fuel to the engine when the speed setting is reduced. The apparatus of the McCathron patent involves a pump or displacement device driven by the movement of the power setting control. We are also aware of Szydlowski U.S. Pat. No. 2,980,175, Apr. 18, 1961, in which a compressed air biased accumulator is connected to a fuel line from a pump to a turbine engine. The Szydlowski installation involves a system of valves to use an accumulator as a means for metering fuel to the engine during acceleration so as not to overfuel in response to an increase in power level setting.

The detailed description of the preferred embodiment of the invention for the purpose of explaining the principles thereof is not to be considered as limiting or restricting the invention, since many modifications may be made by the exercise of skill in the art.

We claim:

1. A fuel supply and control system for a gas turbine engine including means for supplying fuel under pressure, an engine power control effective to meter fuel flow to the engine over a range from minimum flow to full flow in response to the difference between engine power level request and actual engine power level, a fixed orifice for delivering fuel from the power control into the engine, and an engine fuel line connecting the power control to the orifice, characterized by an accumulator in direct open communication with the fuel line between the power control and the orifice, the accumulator having a fixed volume and containing a fixed mass of compressible fluid and a quantity of fuel variable in accordance with pressure in the fuel line, so that the accumulator diverts fuel from the fuel line upon increase of fuel line pressure, and restores fuel to the line by expansion of the compressible fluid upon decrease of fuel line pressure so as to provide a transient fuel flow effective to maintain combustion during deceleration of the engine.

2. A fuel supply and control system for a gas turbine engine including means for supplying fuel under pressure, an engine power control effective to meter fuel flow to the engine over a range from minimum flow to full flow in response to the difference between engine power level request and actual engine power level, a fixed orifice for delivering fuel from the power control into the engine, and an engine fuel line connecting the power control to the orifice, characterized by an accumulator in direct open communication with the fuel line between the power control and the orifice, the accumulator having a fixed volume roughly approximating that of maximum engine fuel consumption in one second, and containing a fixed mass of compressible fluid and a quantity of fuel variable in accordance with pressure in the fuel line, so that the accumulator diverts fuel from the fuel line upon increase of fuel line pressure, and restores fuel to the line by expansion of the compressible fluid upon decrease of fuel line pressure so as to provide a transient fuel flow effective to maintain combustion during deceleration of the engine.

3. A fuel supply and control system for a gas turbine engine including means for supplying fuel under pressure, an engine power control efffective to meter fuel flow to the engine over a range from minimum flow to full flow in response to the difference between engine power level request and actual engine power level, a fixed orifice for delivering fuel from the power control into the engine, an engine fuel line connecting the power control to the orifice, and a shutoff valve in the fuel line between the power control and the orifice, characterized by an accumulator in direct open communication with the fuel line between the power control and the shutoff valve, the accumulator having a fixed volume and containing a fixed mass of compressible fluid and a quantity of fuel variable in accordance with pressure in the fuel line, so that the accumulator diverts fuel from the fuel line upon increase of fuel line pressure, and restores fuel to the line by expansion of the compressible fluid upon decrease of fuel line pressure so as to provide a transient fuel flow effective to maintain combustion during deceleration of the engine.

4. A fuel supply and control system as defined in claim 3 in which the fixed volume of the accumulator roughly approximates that of maximum engine fuel consumption in one second.

* * * * *